INVENTOR.
JESS C. LITTLE

United States Patent Office 3,551,960
Patented Jan. 5, 1971

3,551,960
DEAD ENDING DEVICE
Jess C. Little, Chagrin Falls, Ohio, assignor to The Fanner Manufacturing Company, a Division of Textron Inc., Cleveland, Ohio, a corporation of Rhode Island
Filed May 16, 1968, Ser. No. 729,618
Int. Cl. F16g *11/03, 11/14*
U.S. Cl. 24—123                                17 Claims

ABSTRACT OF THE DISCLOSURE

A field applied dead end and method of making same wherein a plurality of preformed helical rods, or wires are secured at one end thereof preferably by encapsulating material within a socket housing. The other ends project from the socket and are disposed to wrappingly engage and thereby grip a line. A core member projects from the socket and is surrounded by the helically formed rods to provide a stop against which the end of the line being gripped abuts.

---

This invention relates generally to devices for gripping linear bodies and more particularly to dead ending devices for gripping a line. In still more particular aspects this invention relates to a dead ending device and the method of making the same wherein the ends of helically preformed rods are encapsulated within solidified material in a socket and project therefrom for gripping a line. (As used herein the terms dead end and dead ending device are used synonymously.)

There have been many prior art proposals for the gripping of linear bodies to form dead ends. Some of these proposals are the so-called factory applied dead ends. These are formed by physically securing the length of cable to be dead ended in socket housing at both ends. These fittings are applied at the factory and the length of cable or rod with the fittings applied are shipped to the place where they are to be installed. This procedure has a particular advantage in that the socket housing or fitting configuration can be selected to be compatable with the attachment device of the anchoring structure. However, this procedure of factory applied fittings has several serious drawbacks. Foremost among these is that the exact length of cable or rod must be determined and formed at the factory. If this length is not exactly right, the end fittings will not properly match or provide the correct tension. In many types of installations, it is not possible to predetermine with the required degree of accuracy the exact length of the guy ropes.

Because of these drawback to factory applied fittings, so-called field applied fittings are much more widely used than factory applied fittings. Several of these field applied fittings have utilized sets of helically preformed rods bent in the form of a hairpin to form a bight which will engage a support, and a pair of helically formed legs for wrappingly engaging the line to be dead ended.

These field applied fittings have the advantage that the cable may be cut to length in the field on the job and then the fitting applied. However, the field applied fittings have certain drawbacks. One of the principal drawbacks is that the attachment device of the anchoring structure is not always ideally suited for the dead end fitting. This often requires the use of extra hardware items, such as thimbles, bolts and plates, to adapt the attachment device to the dead end fitting. Also, in some larger sizes threading of the fitting through an otherwise compatible attachment device is sometimes difficult.

One of the outstanding advantages of dead end fittings of this invention is that the fitting and attachment compatibility available in the factory applied dead ends is afforded in a field applied fitting. Thus, the desirable features of the field applied fittings are retained and the previous drawbacks have been overcome.

These and other advantages will become apparent from the following description taken in conjunction with the accompanying diagrammatic drawings in which.

Briefly, the present invention contemplates the provision of a socket type, field applied dead end fitting having a plurality of resilient, helically formed rods or wires secured together at one end portion of the rods preferably by being embedded in an encapsulating material contained within a socket housing. The remaining end portions of the rods are located beyond the material and are disposed to wrappingly engage a line. A core member is also preferably embedded in the encapsulating material and projects therefrom within the confines of the helically formed rods and provides a stop against which a line to be gripped may be abutted.

Figure 1:
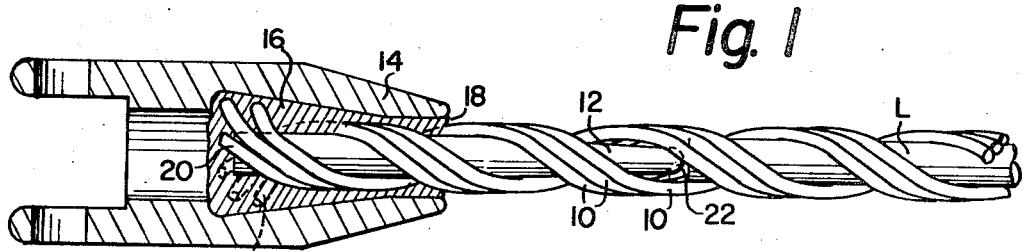
FIG. 1 is a longitudinal sectional view of a dead ending device according to this invention.

Turning now to the drawings, and for the present to FIG. 1, a longitudinal sectional view of one embodiment of a field applied gripping device according to this invention is shown. The gripping device includes a plurality of helically formed resilient rods or wires 10 which substantially conform to each other with respect to pitch length, internal diameter and hand of lay. One end of each of rods 10 is wrapped around a core member 12. One end of the core 12 with the rods wrapped thereon is positioned within the interior of a socket housing 14. The interior of the socket has a solidified encapsulating material 16 introduced therein in which the ends of the rods and the core are embedded. The encapsulating material 16 forms a plug-like mass disposed within the housing 14 from which the opposite ends of the rods 10 and the core 12 project through end opening 18 in the socket housing 14.

The plug-like mass encapsulates the ends of the helical rods 10 and the core 12 within the socket housing 14 and the opposite ends of the helically formed rods 10 are arranged to wrappingly engage and grip a line L as shown in FIG. 1. For this type of engagement, it is preferable that the interior diameter of the helically formed rods be slightly less than the diameter of the line L to which they are to be applied and the rods should be formed of a resilient material such as hard drawn steel or aluminum alloy which are capable of wrappingly engaging the line and being applied thereto from the side without permanent deformation.

In forming the dead end shown in FIG. 1, a plurality of helically formed rods 10 are selected and then wrapped onto a core 12 which preferably is substantially the same or slightly larger diameter than the internal diameter of the helically formed rods 10. As explained above, the helically formed rods 10 substantially conform to each other in pitch and hand of lay and internal diameter.

Figure 1A:
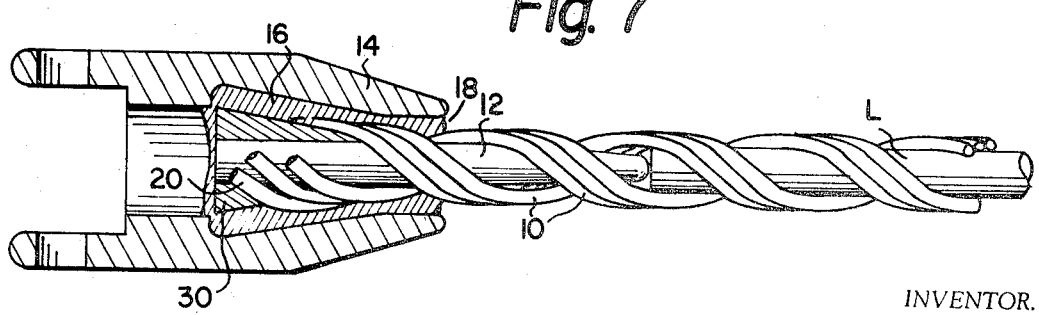
FIG. 1a is a view similar to FIG. 1, incorporating a spreader ring to assist in brooming out the ends of the rods.

These rods when wrapped around the core 10, so that they have a common central axis, are inserted together with the core through the end opening 18 of the socket 14. The ends 20 of the rods are then broomed or spread out within the interior of the socket 14. This may be done by some hand tool, or a spreader ring 30 as shown in FIG. 1a. This takes the form of an annulus generally frusto-conical in shape. The ring 30 may be either left in place and the encapsulating material poured therearound as in FIG. 1a, or it may be removed before the encapsulating material is poured.

Prior to introducing the encapsulating material, some type of removable closure (not shown) is provided around the end opening 18 to prevent the escape of the encapsulating material from the socket 14, before it solidifies. When this closure means is secured in place, suitable encapsulating material is introduced into the socket. This encapsulating material may be a metal such as zinc, which has certain advantages, particularly when the helically formed rods 10 are galvanized steel, or it may be some other relatively low melting point metal or be a plastic or any other material which can be poured into the socket 14 and which will solidify either by cooling or by chemical reaction, and encapsulate the helically formed rods 10, and which will securely hold these rods up to the required strength of the device.

For convenience of operation and economy, the socket housing which is shown is a convenient wire rope socket housing having the interior cavity shaped generally in the shape of a frustum of a cone. Of course, various types of sockets can be used for practising the invention. However, the frusto-conically shaped plug which results from the shape of the interior of the socket is advantageous in that the forces generated, as the tension on the gripping device increases, tend to increase the holder power of the device.

The core 12 serves several functions in the gripping device of this invention. First, it provides a form on which the helically formed rods 10 can be wound and inserted into the socket housing 14 through the core opening 18 before the encapsulating material is introduced. This will keep the rods properly arranged during handling and pouring of the encapsulating material. The use of this form also makes it easier to spread or broom out the ends 20 of the rods 10 within the socket 18. This spreading or brooming out of the ends lessens the tendency of the rods to pull out of the plug of material 18 under tensions.

The core 12 also serves the purpose of filling the region between the end opening 18 and the end of the line 12. It has been found that if there is any substantial unfilled space in the region between the end of the encapsulating material 16 and the end of the line L, there is a propensity, or tendency, for the helically formed rods 10 to collapse in this region when the line is under tension with the attendant failure of this region before the desired strength of the device is reached. This collapsing or necking down is associated with straightening of the rods which causes a twisting of the line. This is undesirable, particularly in certain types of lines such as fibre glass lines which are sensitive to torque stress. Hence it is desirable, especially in heavy load applications, that there be no appreciable unfilled space within the confines of the helical members between the end of the encapsulating material and the end of the line.

However, when helically formed rods are encapsulated as shown, it is difficult, if not impossible, to insert the end of the line L to be gripped up to the end of the plug. This is so because the internal diameter of the helical elements is equal to, or slightly less than the diameter of the line L, and the elements are securely held; hence they cannot be spread apart at the point where they enter the encapsulating material to allow for the line to be admitted up tight against the end of the material 18. Hence, if there is no core or device projecting from the end of the plug of the material 18, there will be a space between the line and the end of the plug which space, as explained above, is undesirable. Even if the elements are spaced to be slightly larger in diameter at the place they exit from the encapsulating material, it is extremely difficult to push a line tight against the encapsulating material. With a projection or core, as described herein, the helical rods 10 can be unwrapped from around the end of the core 12 to allow the line L to be easily abutted up against the end of the core 12, as shown in FIG. 1, and thereby prevent any unfilled space between the end of the line and the end of the plug. In fact, in some cases, it is desirable to form the core with a slightly larger diameter than the line to be held and provide a recess in the end, or provide a hollow sleeve at the end of a solid core, into which the end of the line can be inserted. This will not only assure that there is no space between the end of the line and the core, but will also prevent the end of the line from nicking the helical rods.

The distance which the core projects from the plug of material within the rods may vary with different applications. However, it will normally be necessary that it extend at least one-half pitch length of the helical rods. This is because it has been found that this is about as close to the end of the plug that a line can be conveniently and easily placed.

As shown in FIG. 1, the core 12 is both tapered and rounded at its extreme end as shown at 22. This slight tapering and rounding is a desirable feature to prevent the nicking of the rods 10. This nicking tends to induce stresses, which in certain instances may contribute to premature failure of the helically formed rods. By tapering the core 12, the end thereof is made slightly smaller than the internal diameter of the helically formed rods 10 and the rounding of the end of the core eliminates the sharp stress inducing edges. This desirable configuration allows the full potential strength of the helically formed rods 10 to be utilized without the early failure due to induced stress.

Figure 4:
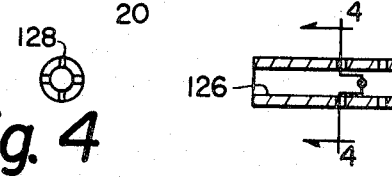
FIG. 4 is a sectional view taken substantially along the line 4—4 of FIG. 3.
Figure 3:
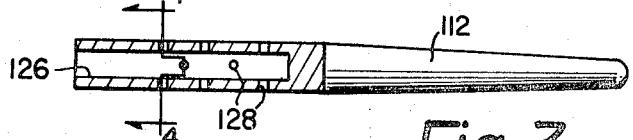
FIG. 3 is alongitudinal sectional view of the core shown in FIG. 2.
Figure 2:
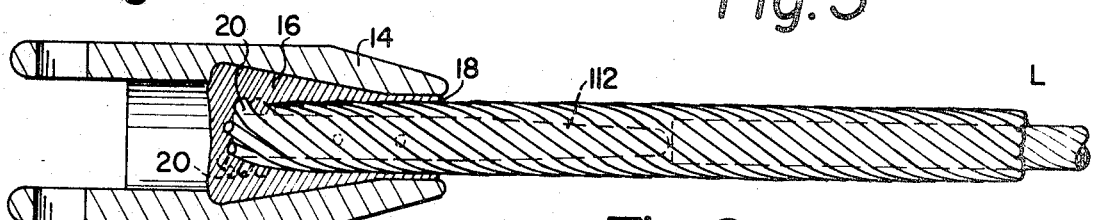
FIG. 2 is a longitudinal sectional view of another embodiment of this invention employing a partially hollow core.

Turning now to FIGS. 2 through 6, various other types of cores are shown which are illustrative of the many different types of cores which can be used. Referring now to FIGS. 2 through 4, a core 112 is provided which is made partially hollow by a bottomed axial bore 126. A plurality of radially extending apertures 128 communicate with the bore 126 to allow for the flow of the encapsulating material as will be explained presently. As can be seen in FIG. 2, the helically formed rods 10 are wrappingly engaged around the core 112 in a similar manner to that shown in FIG. 1. Bore 126 together with the apertures 128 allows the encapsulating material 16 to freely flow between the bore 126 and the hollow socket housing 14 so that the interior cavity is filled with bonding material within the socket housing 14.

The cores shown in FIGS. 1 through 4 illustrates the use of relatively rigid material for a core material.

Figure 5:
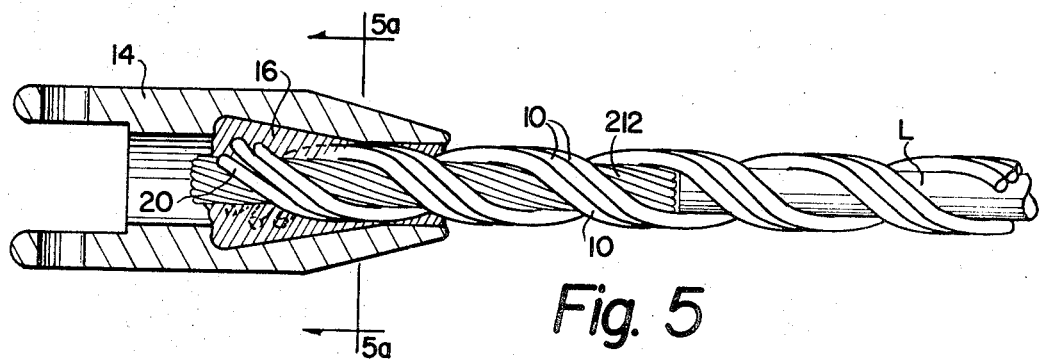
FIG. 5 is a longitudinal sectional view of still another embodiment of a gripping device of this invention employing a set of armor rods as a core.
Figure 5A:
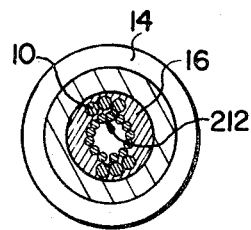
FIG. 5a is a sectional view taken substantially along the line 5a—5a of FIG. 5.

Turning now to FIGS. 5, 5a, 6 and 6a, these figures illustrate the use of flexible material as cores. FIGS. 5 and 5a show the use of a set of armor rods as a core 212 with the encapsulating material poured therearound. These helically formed armor rods have a certain amount of flexibility or resiliency inherent in their formation and for certain applications this structure may be desirable if some additional flexibility is desired in the core. It will be noted that the ends of each of the armor rods are rounded, thereby producing a generally rounded effect at the end of the core. If additional relief is required at the end of the core, the armor rods can be tapered at the ends thereof. This figure also illustrates the use of a completely hollow core from one end to the other as opposed to a partially hollow core shown in FIGS. 2 through 4.

As shown in FIG. 5, the end of the armor rod core 212 extends rearwardly (i.e. in the direction away from the rods 10) past the end of the encapsulating material 16. This will obviate the necessity of any end closure to prevent the liquid encapsulating material from running out through central opening 213 of the hollow core. However, if the end of the core is to be contained within the encapsulating material some type of end cover can be provided to prevent the entrance of the encapsulating material into the opening 213. Depending upon the encapsulating material used and the tightness of the setting of the armor rods, it may or may not be necessary to provide some internal liner within the core to prevent the encapsulating material from seeping between the armor rods into the hollow center.

Figure 6:
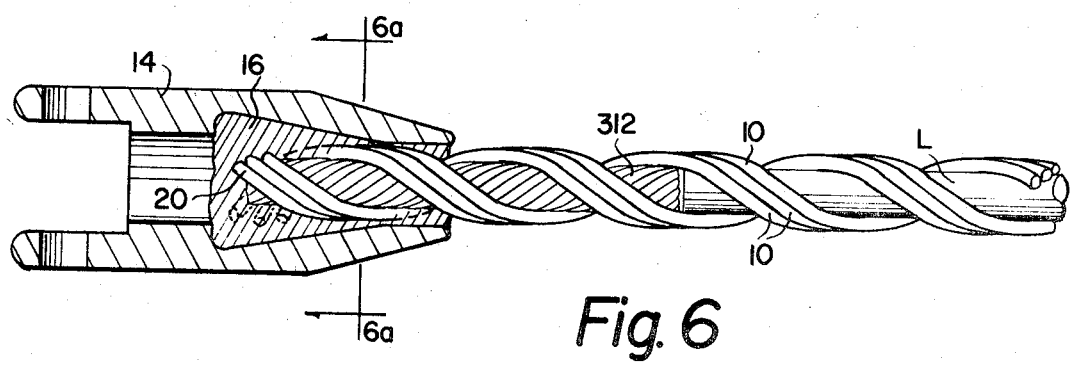
FIG. 6 is a longitudinal sectional view of still another embodiment of this invention employing a stranded rope structure as a core.
Figure 6A:
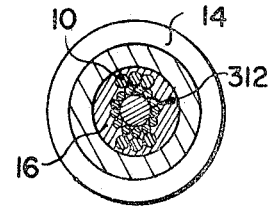
FIG. 6a is a sectional view taken substantially along the line 6a—6a of FIG. 6.

Referring now to FIGS. 6 and 6a, a stranded structure in the form of a rope or cable is shown as a core 312. This type of stranded structure is extremely flexible and where extreme flexibility of the core is the desirable design feature, an independent stranded structure of a core is often quite desirable.

A few of the many possible core configurations and material have been illustarted, but the exact material which is selected for the core is largely dependent upon the encapsulating material to be used and the service to which the gripping device is to be put. For example, if the encapsulating material is a metal, such as zinc, it is necessary for a core material to resist the temperature to which it is necessary to heat the metal in order to melt it. This will normally require a metal core to be used. However, if a low melting encapsulating material is to be used, or if a room temperature liquid material which sets up by chemical reaction is used, then plastic or other materials may be chosen as the core material. The basic requirement for the core material is that the material chosen be compatible with the encapsulating material in that it will not be destroyed or materially weakened, either by heat or by chemical action or reaction therebetween.

Figure 7:
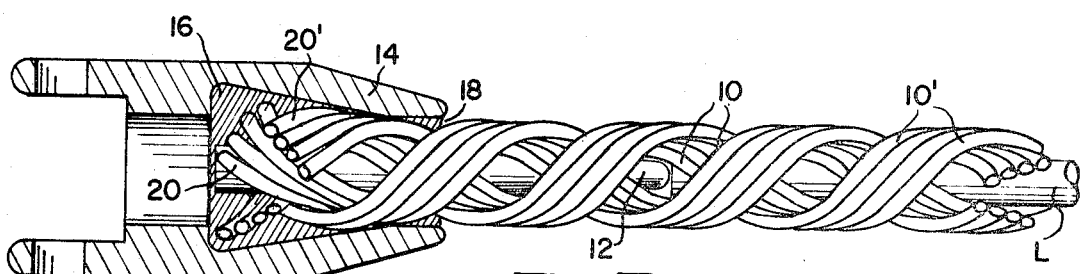
FIG. 7 is a longitudinal sectional view of still another embodiment of this invention wherein two concentric sets of helically formed rods are provided.

Referring now to FIG. 7, yet another embodiment of the gripping device according to this invention is shown. In this embodiment, in addition to the set 10 of the helically formed rods, an additional set or group 10' of helically formed rods is provided which circumferentially surround the underlying group 10 and are wrappingly engaged therewith. This additional group 10' provides additional holding power to the gripping device without increasing the length of the rods which extend from the socket 14. In certain applications, maintaining a relatively short length with maximum gripping power is desired, and the embodiment shown herein is excellently suited for this purpose. As can be seen in FIG. 7, the rods of the set 10' are opposite hand than are the rods of the set 10, but they are of the same pitch length. This is a desirable configuration if minimal torsional stresses are desired, since the opposite hand lays tend to counteract each other in torsional stress components. This is especially desirable for application to fibre glass rods where minimum torsion is desired. It is to be understood, however, that rods of the same hand of lay could be used and also that a different pitch length could be used.

As shown in the drawings, the rods are helically formed throughout their entire length. However, it is necessary only that those portions of the rod which grip the line be helically formed. In fact, for some applications it is desirable that a substantial length of the rods, e.g., up to the end of the core be free of helical formation. These applications include those instances where minimum torque is desired, such as in the case of fiberglass rods. On the other hand, under extreme load conditions where minimum torque is not essential it is desirable that the rods be helically formed in the socket material for maximum resistance to pull-out. Further, it is desirable no matter what their configuration that the ends of the rods in the socket should be spread or broomed out as shown at 20 to increase holding of them in the socket.

Also, as is well known in the art, some type of grip enhancing material may be used on the rods 10. This may take the form of alumina, or other grit, adhesively applied to the rods.

Although several embodiments of this invention have been shown and described, various adaptations and modifications may be made without departing from the scope of this invention as defined in the appended claims.

What is claimed is:

1. A dead ending device for gripping the end of a linear body comprising, a plurality of resilient elements each having first and second end portions, at least said first end portions being helically formed to a self sustaining configuration which configuration will return after deformation within the elastic limit, and substantially conforming to each other with respect to pitch length, hand of lay, and internal diameter, securing means retaining said second end portions of said elements forming a socket from which said first end portions of said elements project, said socket having a projection extending from one end thereof, said first end portions of said elements having a common central axis and being disposed around said projection, said projection terminating within the confines of said elements with said first end portions extending a substantial distance therebeyond for wrappingly engaging the end portion of a linear body to be gripped, at least a portion of said projection being engaged by said elements, said first end portions of the elements having a common central axis and being free of interwoven portions.

2. The device of claim 1 wherein said projection is tapered.

3. The device of claim 1 wherein said projection is rounded at the end thereof.

4. The device of claim 1 wherein said projection projects into said first end portion a distance of at least one-half pitch length of said helically formed first end portions.

5. The device of claim 1 wherein a second group of elements are provided circumferentially surrounding and in engagement with said first group of elements.

6. The device of claim 5 wherein the elements of said second group have a different hand of lay from said first group.

7. The device of claim 1 wherein said second end portions of said elements are helically formed.

8. A device for gripping a linear body comprising, a plurality of resilient elements each having first and second opposite end portions, at least the first end portions of said elements being helically formed to a self sustaining helical configuration, which configuration will return after deformation within the elastic limit, said helically formed portions substantially conforming to each other with respect to pitch length, internal diameter, and hand of lay, securing means retaining said second end portions of said elements, said securing means including a housing member and a core member, said second end portions of said elements being disposed around said core member within said housing, said core member extending from the housing and terminating within the confines of said resilient elements with said first end portions extending a substantial distance therebeyond, at least a portion of the core extending beyond the housing being engaged by said elements, said first end portions having a common central axis and being free of interwove portions.

9. The device of claim 8 wherein said core is relatively rigid.

10. The device of claim 8 wherein said core is a hollow member.

11. The device of claim 5 wherein said core is relatively flexible.

12. The device of claim 8 wherein said core is a stranded structure.

13. The device of claim 8 wherein said core includes an assembled set of helically formed elements.

14. The device of claim 8 wherein said securing means includes solidified encapsulating material with the elements therein.

15. The device of claim 14 wherein said encapsulating material is shaped substantially in the frustum of a cone.

16. The device of claim 14 wherein the ends of the second end portion of said elements are flared out within said encapsulating material.

17. The device of claim 14 wherein said second end portions of said elements are helically formed and surround said core within said encapsulating material.

References Cited

UNITED STATES PATENTS

| | | | |
|---|---|---|---|
| 1,214,709 | 2/1917 | Orr | 24—123.2UX |
| 2,143,985 | 1/1939 | Kellems | 24—123.5UX |
| 2,279,237 | 4/1942 | Kellems | 24—123.5UX |
| 2,664,609 | 1/1954 | Kellems | 24—123.5UX |
| 2,698,150 | 12/1954 | Di Palma | 24—123.5UX |
| 2,766,501 | 10/1956 | Kellems | 24—123.5UX |
| 3,136,844 | 6/1964 | Petersen | 24—123.5UX |
| 3,219,298 | 11/1965 | Rohlman | 248—63 |

BERNARD A. GELAK, Primary Examiner

U.S. Cl. X.R.

174—79; 24—131; 29—460